US012563147B2

(12) United States Patent
Chu et al.

(10) Patent No.: US 12,563,147 B2
(45) Date of Patent: Feb. 24, 2026

(54) SHARED SPEAKERPHONE SYSTEM FOR MULTIPLE DEVICES IN A CONFERENCE ROOM

(71) Applicant: Hewlett-Packard Development Company, L.P., Spring, TX (US)

(72) Inventors: Peter L. Chu, Lexington, MA (US); Yibo Liu, Boxborough, MA (US); Kwan Kin Truong, John's Creek, GA (US); Hua Chen, Atlanta, GA (US); Xiangdong Wang, Carlisle, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 382 days.

(21) Appl. No.: 17/734,011

(22) Filed: Apr. 30, 2022

(65) Prior Publication Data

US 2023/0353680 A1 Nov. 2, 2023

(51) Int. Cl.
| | |
|---|---|
| *H04M 3/00* | (2024.01) |
| *G10L 15/25* | (2013.01) |
| *G10L 17/02* | (2013.01) |
| *H04M 3/56* | (2006.01) |

(52) U.S. Cl.
CPC ............. *H04M 3/569* (2013.01); *G10L 15/25* (2013.01); *G10L 17/02* (2013.01); *H04M 2203/5072* (2013.01); *H04M 2203/5081* (2013.01)

(58) Field of Classification Search
CPC ......... H04M 3/569; G10L 15/25; G10L 17/02
See application file for complete search history.

(56) References Cited

U.S. PATENT DOCUMENTS

| | | | |
|---|---|---|---|
| 6,959,074 B2 | 10/2005 | Berstis | |
| 6,963,353 B1 | 11/2005 | Firestone | |
| 7,995,731 B2 | 8/2011 | Vernick | |
| 2010/0020951 A1* | 1/2010 | Basart ................... | H04M 1/575 |
| | | | 379/142.01 |
| 2014/0118472 A1 | 5/2014 | Liu et al. | |
| 2018/0358034 A1 | 12/2018 | Chakra et al. | |
| 2021/0236379 A1* | 8/2021 | Dai ...................... | A61H 9/0092 |
| 2021/0326379 A1* | 10/2021 | Chopra ................. | G06F 16/683 |

FOREIGN PATENT DOCUMENTS

| | | |
|---|---|---|
| WO | 2018017086 A1 | 1/2018 |
| WO | 2019066782 A1 | 4/2019 |

OTHER PUBLICATIONS

Audiocodes, Inc., C448HD C450HD C470HD IP Phones for Microsoft Teams, Version 1.10, Document LTRT-08504, https://www.audiocodes.com/media/15945/c470hd-c448hd-c450hd-ip-phones-for-microsoft-teams-release-notes-ver-110.pdf, Jun. 2021.

* cited by examiner

*Primary Examiner* — Rasha S Al Aubaidi
(74) *Attorney, Agent, or Firm* — Quarles & Brady LLP

(57) ABSTRACT

A speakerphone system is shared with multiple participant devices of participants in a physical meeting that are using a web conferencing service. An active speaker is identified from the participants. The participant device of the active speaker is switched, such that the speakerphone system receives and renders audio of the active speaker. Video of the participant device of the active speaker is enabled, such that the web conferencing service displays the video to the participant devices.

20 Claims, 4 Drawing Sheets

200

300

Conference Room 204

302-1

Participant Device 1 202-1

302-2

Participant Device 2 202-2

308-1

308-2

Speakerphone System 206

308-3

308-N 302-3

Participant Device 3 202-3

306

302-N

Participant Device N 202-N 304-3

304-N 304-1

Web Conferencing Service 208

304-2

400

Start
402

Identify Active Speaker Of Group
Of Participants in Physical
Meeting
404

Chose Participant Device Of
Active Speaker
406

Capture/Transmit Active Speaker
Audio And
Receive/Render Far End Audio
408

Enable Video Of Participant
Device To Be Shown By Web
Conferencing Service
410

End
412

SHARED SPEAKERPHONE SYSTEM FOR MULTIPLE DEVICES IN A CONFERENCE ROOM

BACKGROUND

Field

This disclosure relates generally to videoconferencing, and more specifically, to shared speakerphone system in a videoconferencing environment.

Related Art

Through information handling systems or devices, web based conferencing meetings through remote or web based are held with participants at various locations. Remote or web based conferencing has been proven to be very useful when participants cannot physically meet in one location. Each participant joins the meeting through their information handling system or device, such as a laptop computer. The devices include microphones that pick up/receive audio (e.g., participant talking), speakers that provide audio, cameras that capture video, and displays/screens that present images and video. As participants have been accustomed to remotely attend web based conferencing meetings, they have found out how useful participating through their devices can be. Participants are able to share with one another data and information on their devices, such as images, video, audio, files, etc.

Remote or web based conferencing works well when participants are not physically with one another. When participants get together to physically meet in one room, issues arise when participants desire to use their devices to join in the meeting. It can be desirable for participants to use their devices as discussed above; however, with different participant devices having their own microphones picking ambient audio and speakers providing audio, there can be cross talk and interference. In addition, there can be issues identifying which participant is actually speaking at the time.

As the value and use of information continues to increase, individuals and businesses seek additional ways to process and store information. An information handling system generally processes, compiles, stores, or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, how quickly and efficiently the information may be processed, stored, or communicated, and security of the information processing, storage, or communication.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention are intended to address the problem of using multiple devices that are using remote web conferencing service in a physical location, such as a conference room. A speakerphone system is shared with multiple devices. The devices are using the web conferencing service to conduct a meeting. The devices are particular to participants participating in the meeting who are using their devices in the physical location (conference room). A participant who is actively speaking during the meeting, known as an active speaker, is identified. The device of the active speaker is chosen or switched to, allowing the speakerphone system to receive and render audio of the device of the active speaker. Video of the device of the active speaker is also enabled to allow the video to be displayed on all the devices participating in the meeting.

Figure 1:
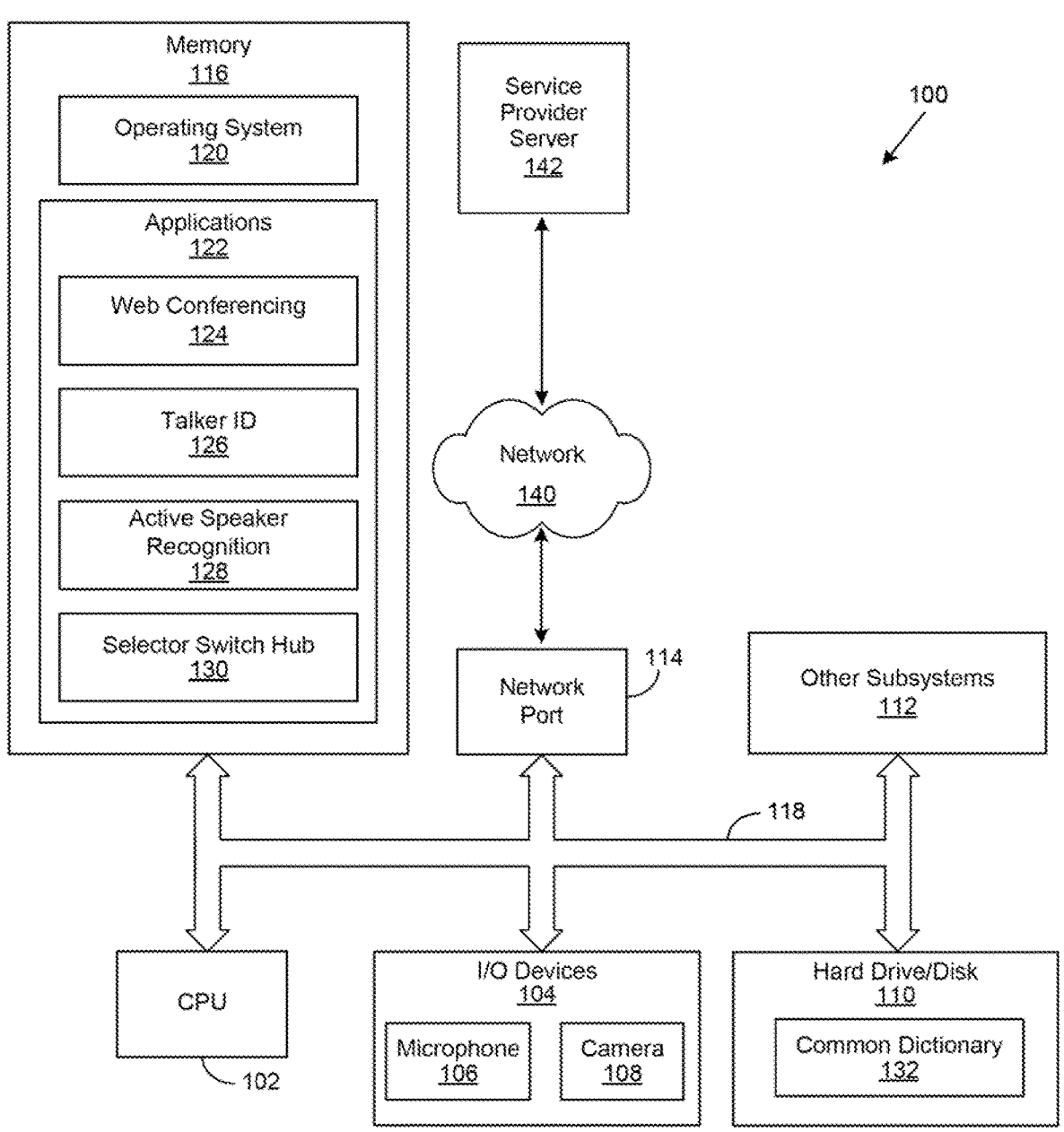
FIG. 1 is a general illustration of components of an information handling system as implemented in the present invention.

FIG. 1 is a generalized illustration of an information handling system 100 that can be used to implement the system and method of the present invention. The information handing system 100 can be a host to the peripheral devices described herein. Implementations provide for the information handling system 100 can include devices such as a notebook or laptop personal computer (PC) or a PC integrated into a keyboard, a smartphone, or other computing device as described herein.

The information handling system 100 includes a processor(s) (e.g., central processor unit or "CPU") 102. The information handling system 100 includes input/output (I/O) devices 104, such as a microphone 106 and a camera 108. Other I/O devices 104 include a speaker(s), a keyboard, a video/display, a mouse, and associated controllers (e.g., K/V/M). The information handling system 100 further includes a hard drive or disk storage 110, and various other subsystems 112.

In various embodiments, the information handling system 100 also includes network port 114 operable to connect to a network 140, where network 140 can include one or more wired and wireless networks, such as WiFi, and including the Internet. Network 140 is likewise accessible by a service provider server 142. The information handling system 100 likewise includes system memory 116, which is interconnected to the foregoing via one or more buses 118. System memory 116 can be implemented as hardware, firmware, software, or a combination of such. System memory 116 further includes an operating system (OS) 120. Embodiments provide for the system memory 116 to include applications 122.

Implementations, provide for the applications 122 to include a web conference application 124 configured to connect to a remote or web video conferencing service as further described herein. Examples of video conferencing services can include Zoom, Microsoft Teams, Google Hangouts, Skype, Dialpad Meetings, TrueConf Online, Skype, FreeConference, Lifesize Go, Slack Video Calls, Facebook Live, YouTube Live, etc.

Applications 122 can include a talker identification (ID) 126 that can be part of a tracker ID system further described herein. Talker ID 126 uses microphone 106 of input/output (I/O) devices 104 to receive voice input of a participant. Implementations provide for enrollment and recognition of participant voices. Enrollment can include receiving a few seconds, such as three seconds, of a participant voice and associating the particular participant voice to a unique signature. In various implementations, the unique signature is associated with a unique identifier, such as a "192" place value numerical identifier.

Talker ID 126 and talker ID system can be based on an active machine learning model that processes audio to create the unique signatures that are associated to participants. When a participant speaks into the microphone 106, talker ID 126 is configured to recognize the enrolled identified voice which is associated with a participant. Implementations provide for talker ID 126 to recognize the participant and the device (i.e., information handling system 100) that is being used. Implementations provide for information handling system 100 and talker ID 126 to enroll more than one participant.

Applications 122 can include active speaker recognition 128. When a participant speaks, they are considered as an active speaker. The active speaker "controls" the audio of the meeting, where the active speaker is able to talk over other participants. Active speaker recognition 128 detects (active speaker detection) and acknowledges the active speaker. Implementations include active speaker recognition 128 to provide for the "reading" of lips of participants. Camera 108 of I/O devices 104 captures video of participants. The video focusing on the lips of the participants. Using camera 108 and active speaker recognition 128, a participant lips are detected as moving. A participant whose lips are moving is recognized as actively talking and identified as an active speaker. For implementations where active speaker recognition is solely used, no training or enrollment is involved, unlike when talker ID 126 is used.

In various implementations, active speaker recognition 128 works with talker ID 126 to identify the talking participant (active speaker), where the active speaker is recognized by active speaker recognition 128 and talker ID 126. Talker ID 126 creates a unique signature for active speakers who have not been previously enrolled.

Applications 122 includes a selector switch hub 130. The selector switch hub 130 is configured to go between devices of participants. In various implementations, the selector switch hub 130 selects and automatically switches to a "best device". The "best device" is the device whose microphone 106 is allowed to pick audio and through the web conferencing service The audio is sent by the web conference service to a speakerphone system supporting the meeting between participants. The "best device" is the device of the active speaker.

Implementations provide for information handling system 100, and particularly hard drive/disk 110 to include a common dictionary 132. As discussed, the talker ID 126 and talker ID system as further described herein, is used to enroll unique signatures of voices of participants. Implementations provide for the enrolled signatures to be stored in common dictionary 132. The common dictionary 132, along with active machine learning model further described herein, is used to infer active speaker during meetings. In certain implementations, a talker ID auto-pairing is performed. A prestored talker ID signature and a device (e.g., laptop) information pair is created, associating participants with devices (e.g., laptops). Such talker ID-device pairs can be stored in common dictionary 132. In various implementations, talker ID-device pairs can be used when joining meetings. In various implementations, when a device (e.g., laptop) identifies that the participant is talking, selector switch hub 130 detects the that the same participant is talking, and it is determined that the device (e.g., laptop) is in the same room (e.g., conference room) as the participant.

In certain implementations, relevant entries are extracted from common dictionary 128 for a specific meetings, considering that numerous entries can be accumulated in common dictionary, and only relevant entries (e.g., participants) are used for a specific meeting. This can reduce computational cost and increase accuracy. Implementations provide for subsequent meetings to use the same data/information in the common dictionary 128.

Figure 2:
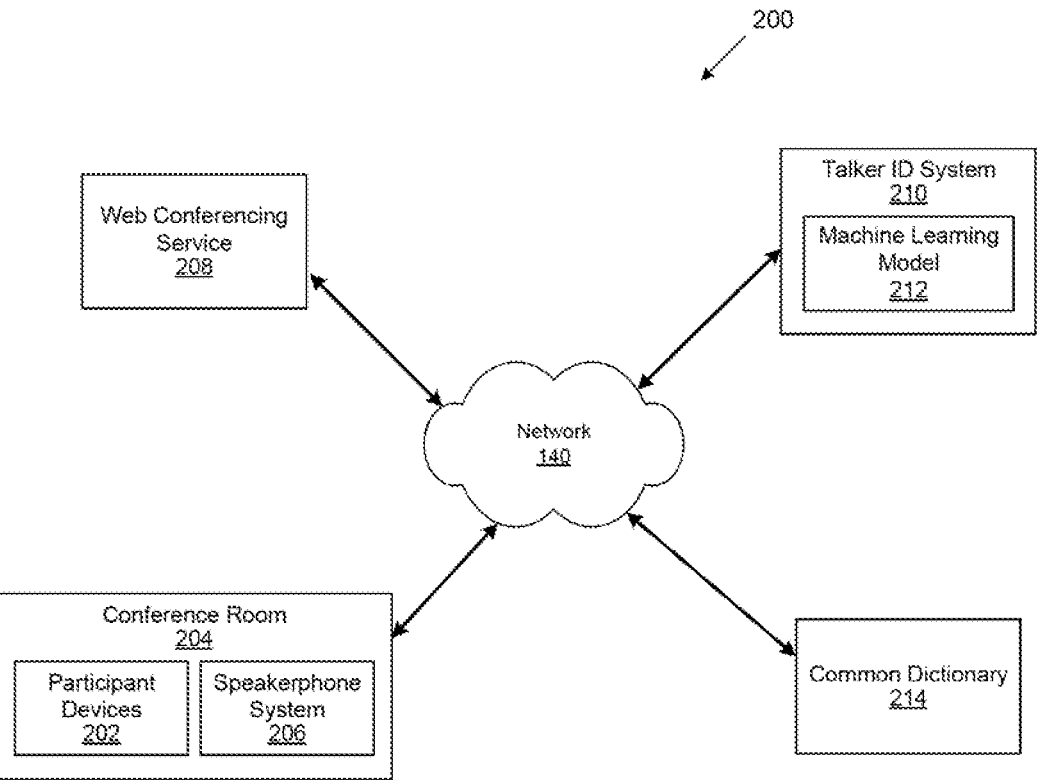
FIG. 2 is general illustration of a system for multiple devices to share a speakerphone system in accordance with embodiments of the present invention.

FIG. 2 is general illustration of a system for multiple devices to share a speakerphone system 200 to implement the methods of the present invention. The system 200 includes the network 140. As discussed, network 140 can include wired and wireless networks, including the Internet. Network 140 provides interconnectivity between the elements of system 200.

The system 200 includes participant devices 202. Implementations provide for the participant devices 202 to be configured as an information handling system 100 described in FIG. 1. The participant devices 202 are used by and associated with participants in a meeting in a physical location, such as conference room 204. The participant devices use a speakerphone system 206 located in conference room 204. Implementations provide for the speakerphone system 206 to pick up audio and render the audio to the web conferencing service 208, as further described herein.

The participant devices 202 and speakerphone system 206 connect to and use a web conferencing service 208. As discussed, examples of web conferencing services can include Zoom, Microsoft Teams, Google Hangouts, Skype, Dialpad Meetings, TrueConf Online, Skype, FreeConference, Lifesize Go, Slack Video Calls, Facebook Live, YouTube Live, etc. Implementations provide that one web conferencing service is used for participant meetings. As discussed, participant devices access a web conferencing service 208, when a meeting takes place.

In various implementations, the system 200 includes a talker ID system 210. Embodiments provide for the talker ID system 210 to be configured as an information handling system described in FIG. 1. It is also to be understood that the talker ID system 210 can be implemented in various computing platforms, including cloud computing. Implementations include the talker ID system 210 to be configured as an edge device as part of a local network (e.g., within conference room 205). Implementations provide for edge devices to be configured as conference devices, such as video bars. Implementations also include talker ID system 210 to be configured as dedicated server or servers.

Implementations provide for the talker ID system 210 to be communicate and receive data/information from the Talker ID application 122 of participant devices 206. As discussed, enrollment of participants can be implemented, where a participant's voice is received and a unique signature is associated with the participant's voice. An active machine learning model 212 processes the audio to create the unique signatures.

In various implementations, the system 200 includes a common dictionary 214. As discussed, a common dictionary 128 can be included in an information handling system 100; however, common dictionary 214 can also be provided in remote store. As discussed, common dictionary 214 can be used to store the enrolled unique participant signatures. The common dictionary 214, along with active machine learning model 212 can be used to infer an active speaker during meetings. As discussed, talker ID auto-pairing is performed. Talker ID-device pairs can be stored in common dictionary 214.

As discussed, in certain implementations, relevant entries can be extracted from common dictionary 132 for specific meetings, which also applies to the common dictionary 214. Implementations can also provide for subsequent meetings to use the same data/information in the common dictionary 214.

Figure 3:
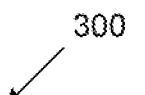
FIG. 3 is a general illustration of a system for a conference room that supports multiple devices that share a speakerphone system in accordance with embodiments of the present invention.

FIG. 3 is a general illustration of a system 300 for conference room 204 that supports multiple participant devices 202 that share speakerphone system 206. Multiple participants 302-1 to 302-N physically gather for a meeting in conference room 204 or other physical location. Each participant 302 has their own participant device 202, which can include laptop computers/laptops. Implementations provide for the participant devices 202 to have a camera view and web conference account or web conference application 124 that connects to web conferencing service 208 via respective connectivity 304. Connectivity 304 can be through WiFi, WLAN, other wired/wireless communications, including a combination of such, including network 140.

Although, the participant devices 202 are configured with microphones 106 and speakers (i.e., I/O devices 104), such microphones 106 and speakers can be different from one another, and have varying sensitivity, frequency response, output, etc. Therefore, in various implementations, the speakerphone system 208 is used to pick up audio from participants 302, instead of the microphones 106 of the participant devices 202. The audio is sent from the speakerphone system 206 to the web conferencing service 208, where speakerphone system 206 is connected to web conferencing service 208 by connectivity 306. Connectivity 306 can be through WiFi, WLAN, other wired/wireless communications, including a combination of such, including network 140. Implementations provide for the web conferencing service 208 to provide audio (i.e., meeting audio) to the speakerphone system 206.

Implementations provide for the participant devices 202 to transmit video to the web conferencing service 208. In particular, video feed of a participant device 202 of an identified active talker is provided by the web conferencing service 208. In other words, an active talker is identified, and only the video feed of the participant device 202 to web conferencing service 208 of that active talker is provided by the web conferencing service 208. Web conferencing service 208 sends the video to all participant devices 202 to be displayed as part of the meeting. Each participant 302 receives the video on their respective participant devices 202

The participant devices 202 are connected to the speakerphone system 206 by respective connectivity 308. In various embodiments, speakerphone system 206 is configured as a computing device, such as an information handling system 100 described in FIG. 1. Various configurations include the speakerphone system 206 to be implemented as a video bar, video conferencing system, conference phone, etc.

Implementations provide for the speakerphone system 208 to include the applications talker ID 122 to identify an active speaker, and selector switch hub 126 to select a participant device. When speakerphone system 208 is configured with selector switch hub 126, speakerphone system 208 performs the switching between active speakers (i.e., participants 300). In other implementations, one of the participant devices 206 is configured with the selector switch hub 126 and performs the switching between active speakers (i.e., participants 300). Implementations provide for the speakerphone system 208 to connect with this participant device 206 and the participant devices 206 by USB, or other wired/wireless connections.

As discussed, the selector switch hub 126 is configured to automatically switch between participant devices 202. In particular, the selector switch hub 126 switches to a "best device". When the active talker is recognized by either talker ID 122 or talker ID system 210, the participant device 202 of that active talker is identified as the "best device." In other words, the "best device" is identified based on which participant that is actively speaking. In various implementations, the "best device" is the device whose microphone 106 is allowed to pick audio and through the web conferencing service, the audio is rendered to a speakerphone system supporting the meeting between participants. The "best device" is the device of the active speaker.

Alternatively, as described, instead of using talker identification which requires training, which a participant may not desire, video detection of synchronization of lip movement can decide which participant device 202 has an active talker in front of the participant device 202. For this approach, no training/enrollment is required.

Figure 4:
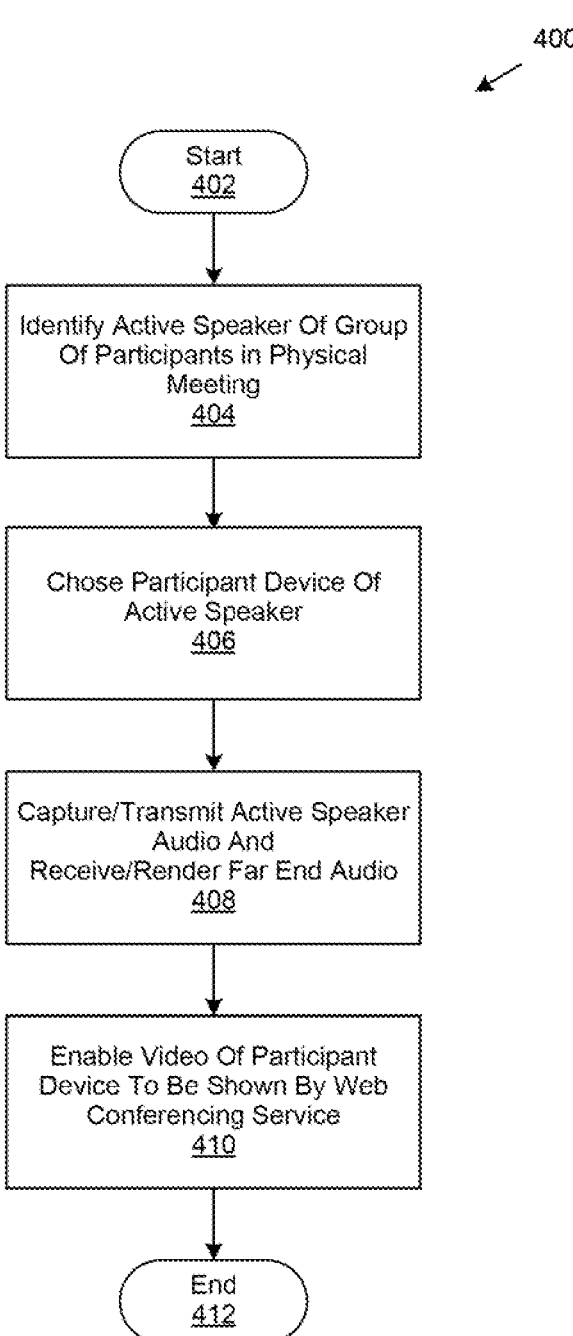
FIG. 4 is a generalized flowchart for sharing a speakerphone system with multiple devices in a conference room setting in accordance with embodiments of the present invention.

FIG. 4 is a generalized flowchart for sharing a speakerphone system with multiple devices in a conference room setting. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 402, the process 400 starts. At step 404, identifying is performed of an active speaker of a group of participants in a physical meeting. The physical meeting is in a conference room or similar location where the group of participants are gathered. The group of participants participate in a videoconferencing meeting using their particular participant devices 202, and access a web conferencing service 208 as described herein. The identifying is performed using talker ID 126, talker ID system, or active speaker recognition 128.

At step 406, choosing the participant device 202 of the identified active speaker is performed. In particular, the chosen participant device 202 is the participant device 202 identified by the web conferencing service 208 to provide audio and video feed to the web conferencing service 208. The web conferencing service 208 sends audio to be played on the speakerphone system 206, and video to be displayed on the participant devices 202. The switching can be performed by the selector switch hub 130 described herein.

At step 408, capturing/transmitting active speaker audio and receiving/rendering far-end audio is performed. The active speaker's audio is captured by a microphone of the speakerphone system 208 and routed by selector switch hub

126 to the active speaker's device 206. The active speaker's device 206 sends the audio to far-end by the web conferencing service 202. The far-end audio is received by active talker's device 206 from the web conferencing service 202, and routed by selector switch hub 126 to the speakerphone system 208, and render through a speaker of speakerphone system 208.

At step 410, enabling video of the participant device 206 is performed to allow the video to be shown by the web conferencing service 202. Each participant device 206 has their own video; however, the video of the participant device 206 of the active speaker is displayed/shown by the web conferencing service 202. At step 412, the process 500 ends.

Although the invention is described herein with reference to specific embodiments, various modifications and changes can be made without departing from the scope of the present invention as set forth in the claims below. For example, the number of machine-learning models and associated granularities used and the nature of the application generating the well-defined normal behavior data. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implemented method for sharing a speakerphone system with multiple participant devices comprising:

identifying an active speaker of a group of participants in a physical meeting setting using a web conferencing service;

choosing a participant device of the identified active speaker;

sending audio of the identified active speaker to the web conferencing service, wherein the web conferencing service provides audio to the speakerphone system; and enabling video captured by the participant device to be shown by the web conferencing service on all participant devices of the group of participants, wherein the identifying comprises enrolling voice signatures each associated with a participant's voice of the group of participants and identifying the active speaker using an enrolled voice signature, wherein the enrolled voice signatures are stored in a common dictionary configured to be accessed by each participant device.

2. The computer-implemented method of claim 1, wherein the enrolled voice signatures are associated with participant devices.

3. The computer-implemented method of claim 1, wherein the identifying is performed by capturing a voice of the active speaker, generating a voice signature based on the captured voice, and comparing the generated signature to the enrolled voice signature.

4. The computer-implemented method of claim 1, wherein the identifying is performed by active speaker recognition recognizing movement of lips of the active speaker.

5. The computer-implemented method of claim 1, wherein the choosing is performed by the participant device.

6. The computer-implemented method of claim 1, wherein the choosing is performed by the speakerphone system.

7. The computer-implemented method of claim 1, wherein the enrolled voice signatures are associated with unique identifiers.

8. The computer-implemented method of claim 1, further comprising receiving voice input of participants and implementing recognition and enrollment of participant voices.

9. The computer-implemented method of claim 8, further comprising recognizing the enrolled voice signature is associated with the active speaker when the active speaker speaks into the speakerphone system.

10. The computer-implemented method of claim 1, wherein the voice input is processed to create the voice signatures associated with the participants by an active machine learning model.

11. The computer-implemented method of claim 1, wherein the identifying further comprises creating device information pairs associating participants with participant devices, wherein the device information pairs are stored in the common dictionary.

12. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations for sharing a speakerphone system with multiple participant devices and comprising instructions executable by the processor to:

identify an active speaker of a group of participants in a physical meeting setting using a web conferencing service;

choose a participant device of the identified active speaker;

send audio of the identified active speaker to the web conferencing service, wherein the web conferencing service provides audio to the speakerphone system; and enable video captured by the participant device to be shown by the web conferencing service on all participant devices of the group of participants, wherein the identifying comprises enrolling voice signatures each associated with a participant's voice of the group of participants and identifying the active speaker through an enrolled voice signature, wherein the enrolled voice signatures are stored in common dictionary configured to be accessed by each participant device.

13. The system of claim 12, wherein the identifying is performed by active speaker recognition recognizing movement of lips of the active speaker.

14. The system of claim 12, wherein the choosing is performed by the speakerphone system.

15. A non-transitory, computer-readable storage medium embodying computer program code for sharing a speakerphone system with multiple participant devices, the computer program code comprising computer executable instructions to:

identify an active speaker of a group of participants in a physical meeting setting using a web conferencing service;

choose a participant device of the identified active speaker;

send audio of the identified active speaker to the web conferencing service, wherein the web conferencing service provides audio to the speakerphone system; and enable video captured by the participant device to be shown by the web conferencing service on all participant devices of the group of participants, wherein the identifying comprises enrolling voice signatures each associated with a participant's voice of the group of participants and identifying the active speaker through an enrolled voice signature, wherein the enrolled voice signatures are stored in common dictionary configured to be accessed by each participant device.

16. The non-transitory, computer-readable storage medium of claim 15, wherein the enrolled voice signatures are associated with participant devices.

17. The non-transitory, computer-readable storage medium of claim 15, wherein the identifying is performed by active speaker recognition recognizing movement of lips of the active speaker.

18. The non-transitory, computer-readable storage medium of claim 15, wherein choosing the participant device is performed by one participant device of the multiple participant devices.

19. The non-transitory, computer-readable storage medium of claim 15, wherein choosing the participant device is performed by the speakerphone system.

20. The non-transitory, computer-readable storage medium of claim 15, wherein the participant devices are configured to be chosen and switched by a selector switch hub.

\*　\*　\*　\*　\*